(12) United States Patent
Bilodeau et al.

(10) Patent No.: US 6,424,430 B1
(45) Date of Patent: Jul. 23, 2002

(54) RENDERING OF OBJECTS ON GRAPHICAL RENDERING DEVICES AS CLIPPED IMAGES

(75) Inventors: William D. Bilodeau, Boulder Creek; Paul George, Los Altos; David R. Lazarony, Jr., San Jose, all of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/072,503

(22) Filed: May 4, 1998

Related U.S. Application Data

(63) Continuation-in-part of application No. 09/056,894, filed on Apr. 6, 1998.

(51) Int. Cl.[7] .............................. G06F 15/00; G06K 1/00
(52) U.S. Cl. ..................... 358/1.2; 358/1.18; 382/260
(58) Field of Search ................................ 382/181, 196, 382/242, 243, 266, 199; 358/1.18, 1.17, 1.2; 364/516, 559; 345/425, 427

(56) References Cited

U.S. PATENT DOCUMENTS 5,544,291 A * 8/1996 Gilley et al. ................. 345/423
6,124,858 A * 9/2000 Ge et al. ...................... 345/425

* cited by examiner

*Primary Examiner*—Edward Coles
*Assistant Examiner*—Twyler Lamb
(74) *Attorney, Agent, or Firm*—Fish & Richardson P.C.

(57) ABSTRACT

The invention renders a resolution independent object having a silhouette by rendering the object to a buffer, determining the silhouette of the object from the buffer, generating a clipped image of the silhouette, and rendering the clipped image on the graphical rendering system.

35 Claims, 9 Drawing Sheets

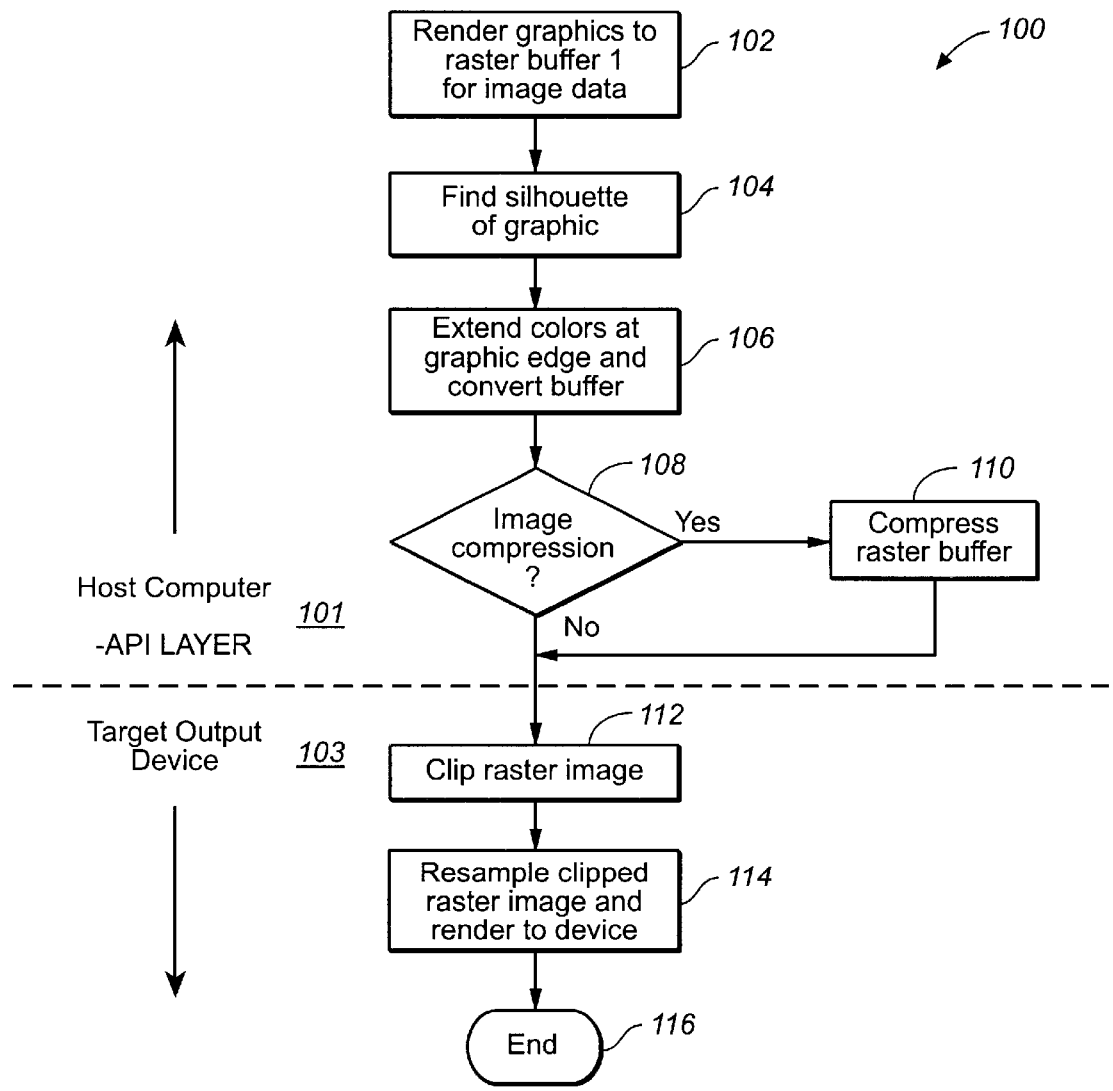
FIG._1

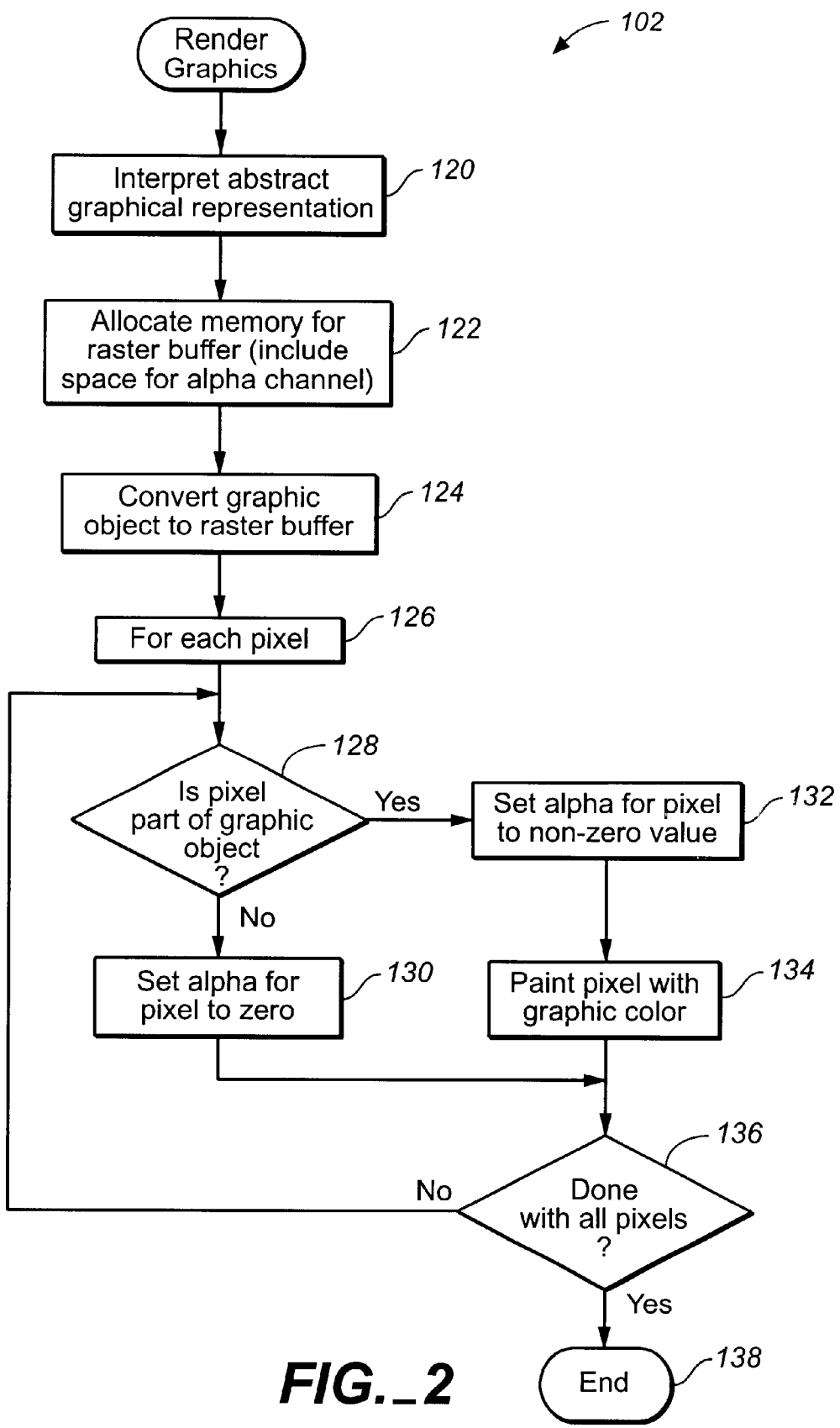
FIG._2

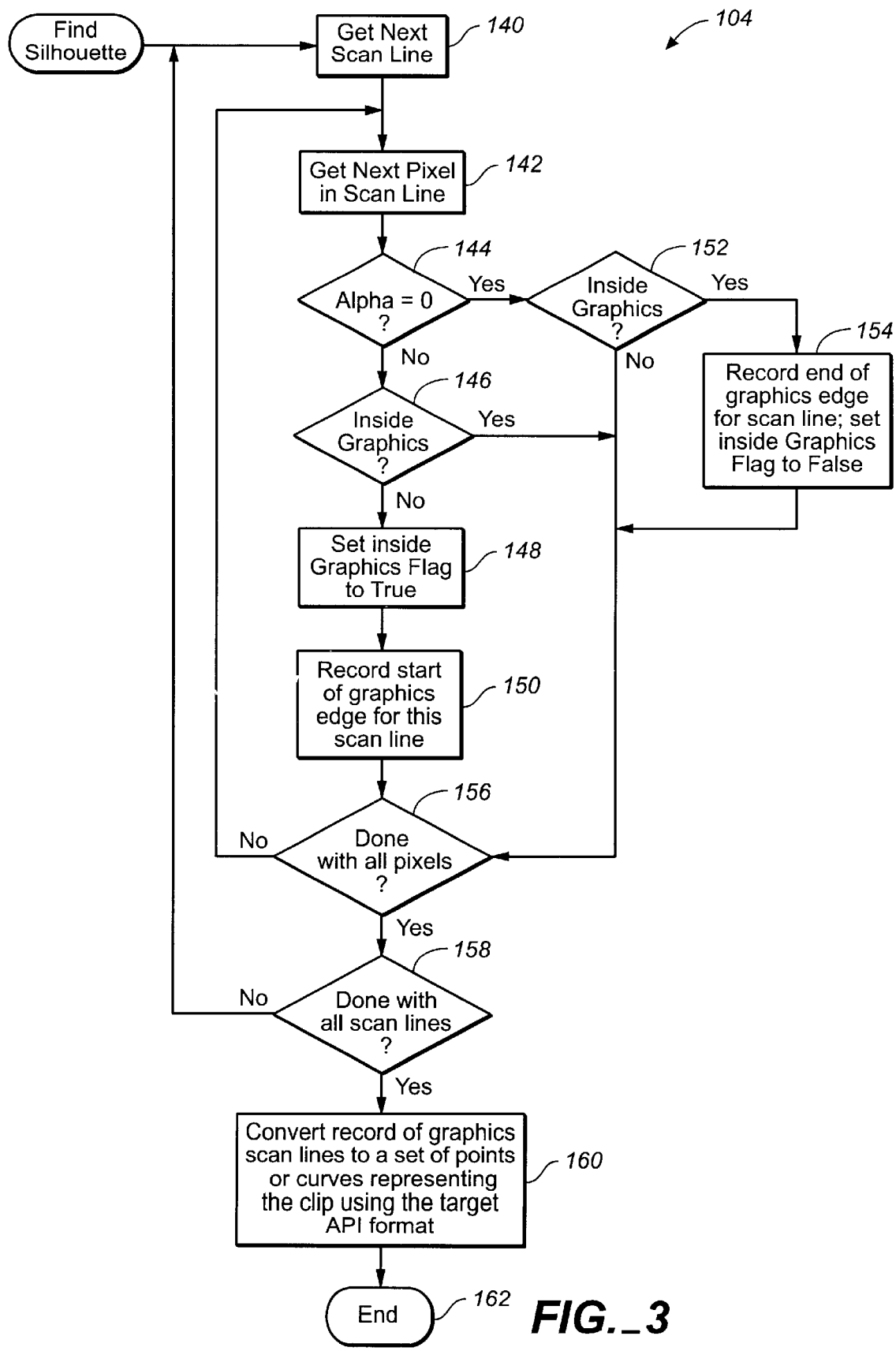
FIG._3

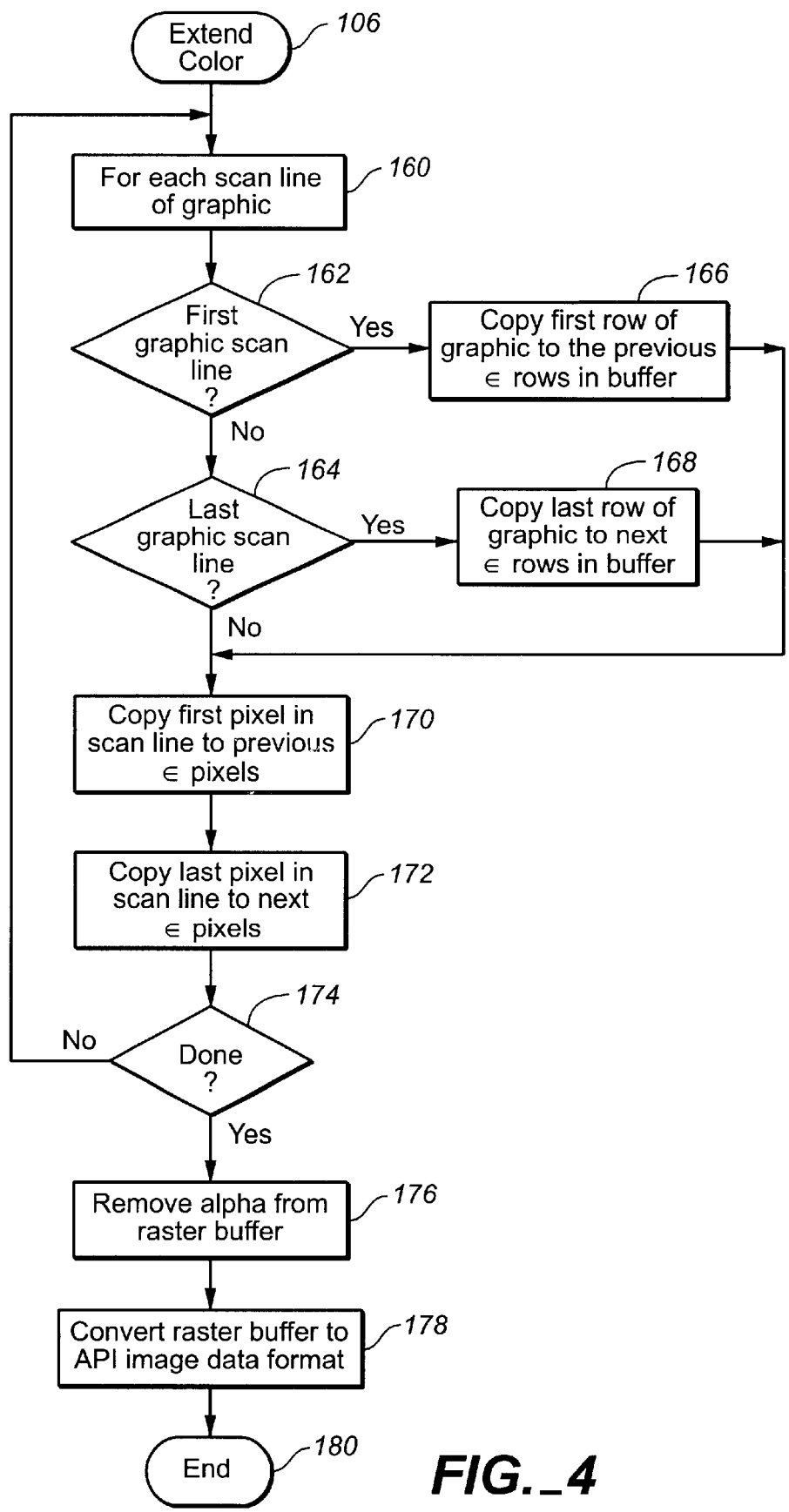
FIG._4

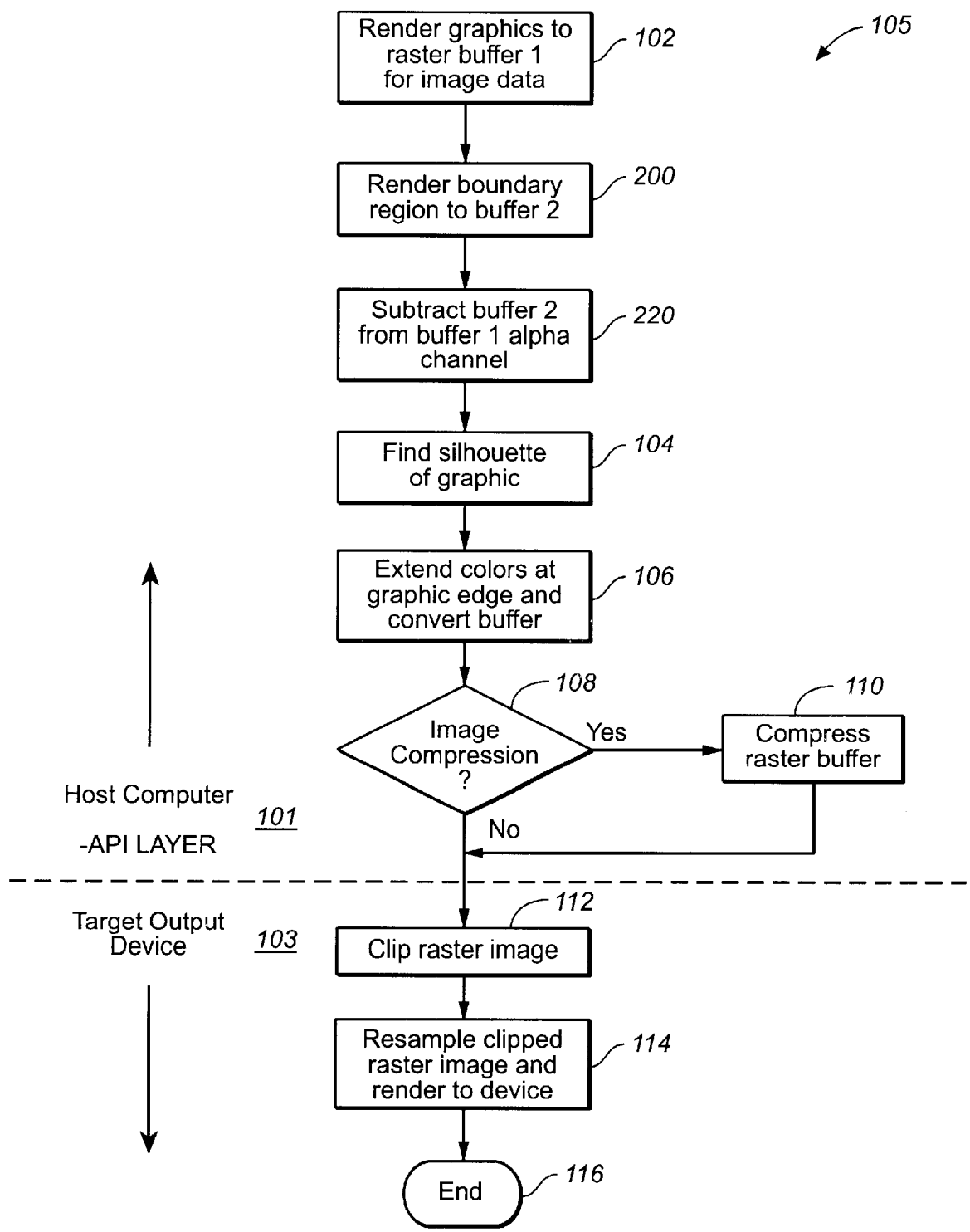
FIG._5

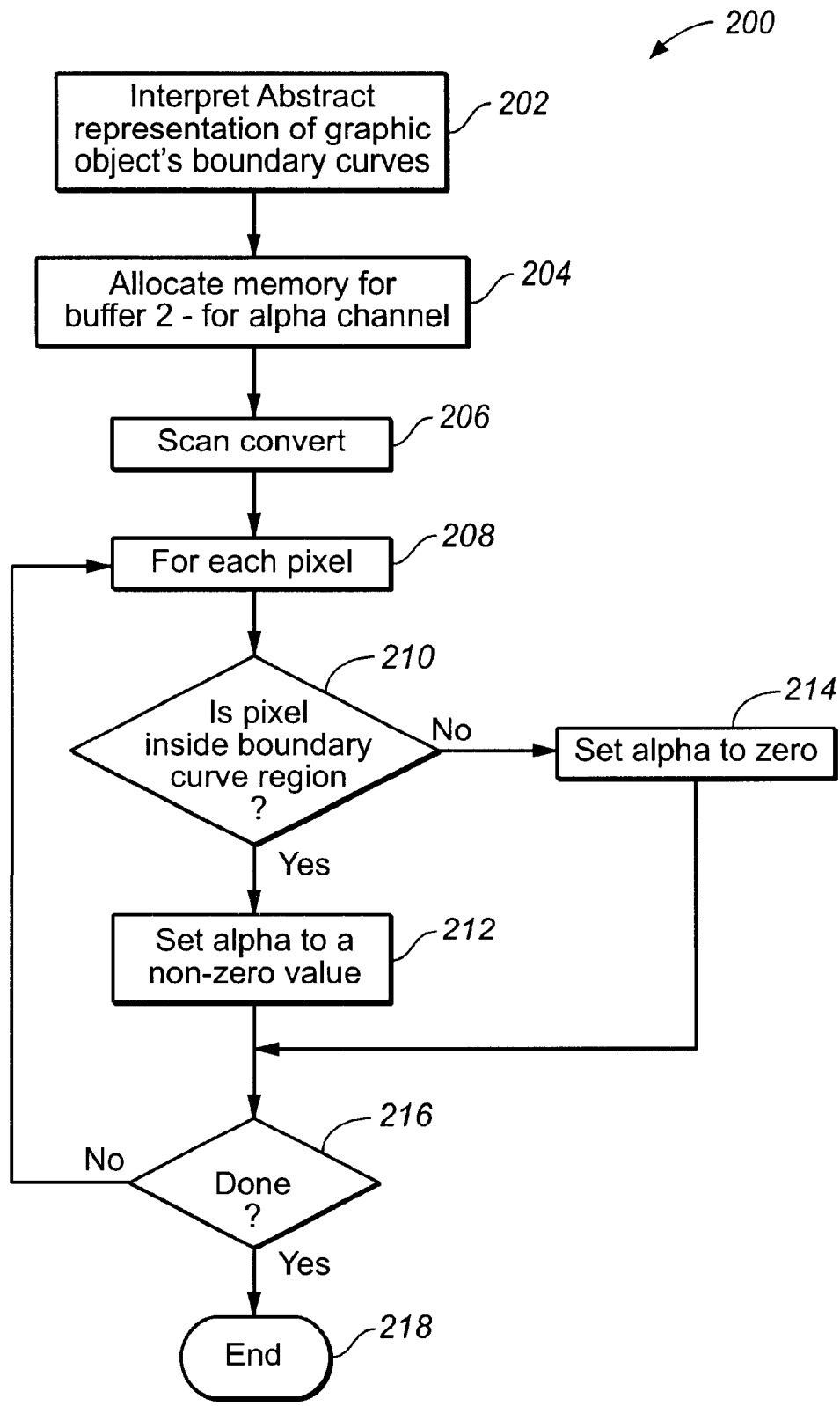
FIG._6

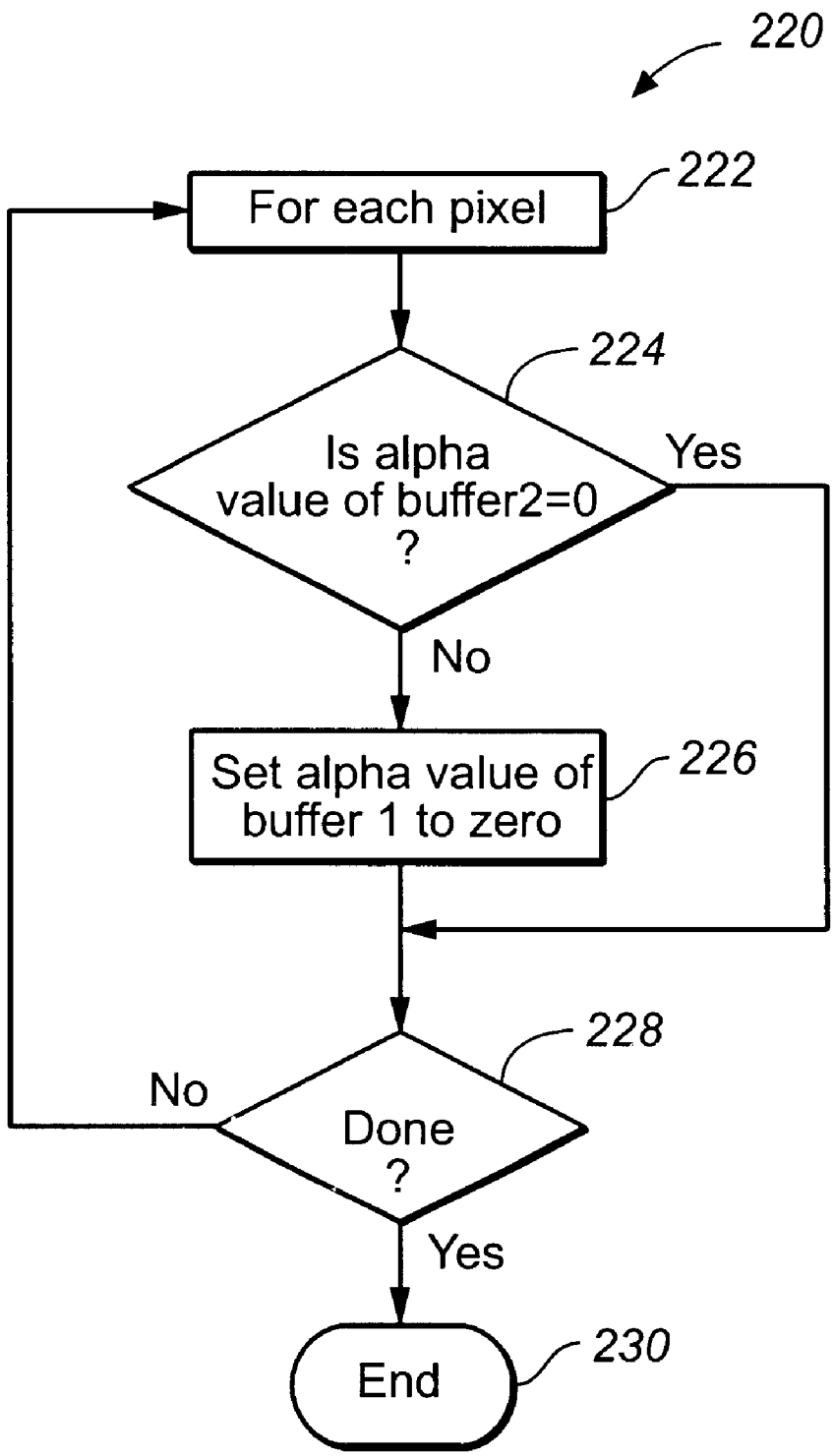
FIG._7

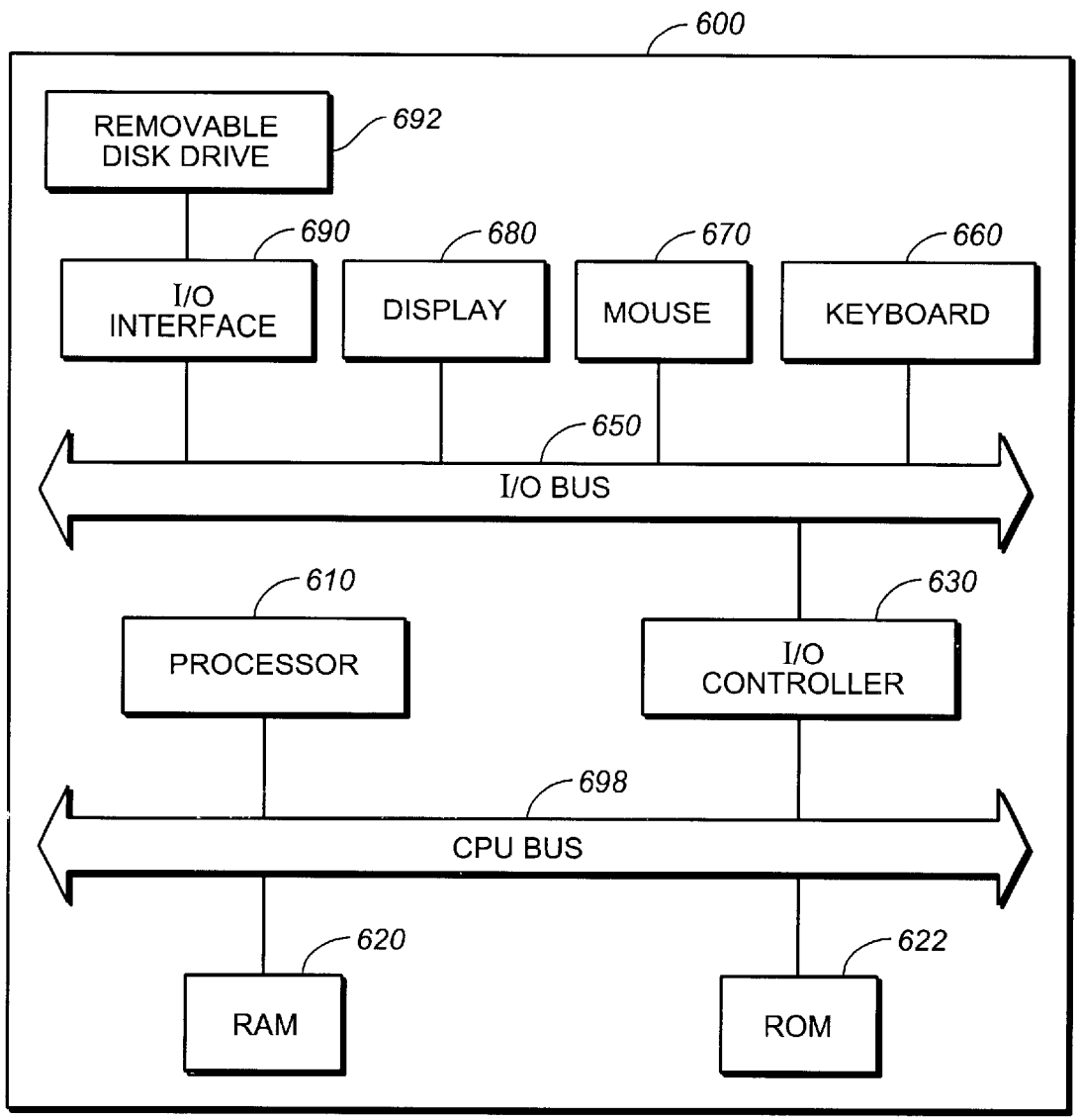
FIG._8

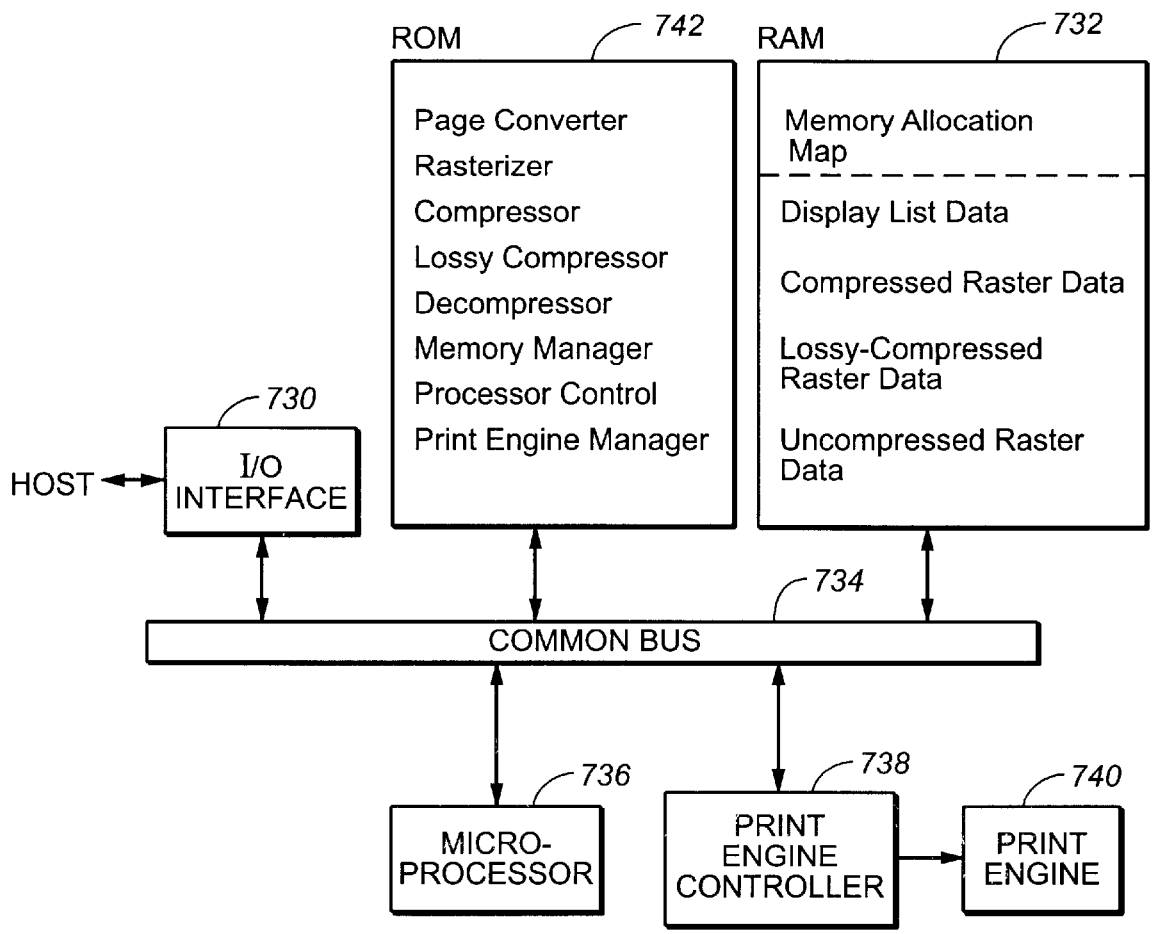
FIG._9

RENDERING OF OBJECTS ON GRAPHICAL RENDERING DEVICES AS CLIPPED IMAGES

The application is a continuation in part of U.S. Application Ser. No. 09/056,894, entitled "RENDERING OF OBJECTS ON GRAPHICAL RENDERING DEVICES AS CLIPPED IMAGES," filed by William D. Bilodeau, Paul George and David R. Lazarony on Apr. 6, 1998.

BACKGROUND

The present invention relates generally to methods and systems for rendering computer generated images and more particularly to methods and apparatus for rendering image objects on a hard copy device.

In many computer systems, it is common to represent and convey information to a user through digital images. These images may take a variety of forms such as alphanumeric characters and graphs and other pictorial representations. The digital images are conveyed to a users on graphical rendering devices, such as video monitors, printers and the like. Typically, the digital images are stored in digital form, manipulated and then displayed on a monitor or printed on a hard copy device such as a printer.

To provide flexibility and high quality output, printers capable of accepting page description languages were developed whereby a page with graphics, text, and images may be represented using successive commands of the page description language. In these printers, after receiving the page description language commands, a desired image is rasterized so that a print engine in the printer can generate the page by turning on or off individual dots or pixels across the printed page in a raster scan line.

One popular page description language is the PostScript® page description language available from Adobe Systems Incorporated of San Jose, Calif. The PostScript® page description language is described in *PostScript Language Reference Manual*, Addison-Wesley (2d. ed. 1993). Moreover, over the years, a number of versions of this language have been developed. Each PostScript® version defines application programming interface (API) providing a number of predefined geometric primitives.

In computer graphics, color may be applied to a region by defining a single color for the entire region (a "flat" coloring), or to add realism, multiple colors may be employed. In order to display a realistic image, a smooth transition between colors across painted areas is often required. This capability is required for both the display device as well as the hard copy device. One version of the PostScript® language, Level 3, supports smooth transitions between paths and between colors. Once a smooth shading is defined for a particular region, a user may easily adjust the shading and create complex color gradients for the filled region. Smooth shading has an additional benefit over conventional shading techniques: because the gradients are rendered pixel by pixel on the given display device, they can include all of the colors the device is capable of reproducing, and at the highest resolution possible.

Presently, as the smooth shading capability is available only for Level 3 PostScript® printers, it would be desirable to add this capability to earlier PostScript® printers to save users the expenses associated with buying new printers. However, subtle color changes in a shaded region may be difficult to express in terms of standard geometric primitives of earlier versions of Postscript® since each shaded region may need to be defined as its own unique polygon primitive. As the number of unique polygon primitives increase, the time required to render the primitives also increases.

Moreover, many graphics APIs support the rendering of sampled image data which may emulate the desired graphical effect. However, particular shapes of the graphics primitives may not match the shape of the image, leading to an improper rendering of the image on the hard copy device.

SUMMARY

The invention renders a resolution independent object having a silhouette by rendering the object to a buffer, determining the silhouette of the object from the buffer, generating a clipped image of the silhouette, and rendering the clipped image on the graphical rendering system.

Implementations of the invention may include the following. The method may render the object to the alpha channel. Moreover, the silhouette may be determined by searching the alpha channel. The method may also calculate one or more edges of the object from the silhouette. The method may also extrapolate the edges of the object. The extrapolation may be done by extending bits associated with the color of the edges of the object in the buffer. The method can also compress the clipped image using a number of standard or conventional compression methods such as Joint Photographics Expert Group (JPEG) compression.

In implementations involving PostScript® printers, the clipping step is performed using a PostScript® clip operator and the rendering step is performed using a PostScript® image operator.

In another aspect, the method renders the resolution independent object on a graphical rendering system having an application program interface (API) by retrieving the resolution independent object and generating a smoothly shaded image of the resolution independent object. The smoothly shaded image is generated by: rendering the object as a raster image in a first buffer; calculating a silhouette of the raster image; calculating a clipping path from the silhouette, the clipping path defining the silhouette of the object; and providing the raster image and the clipping path to the rendering system API.

Implementations of this aspect include the following. The API is a PostScript Level 1 or Level 2 API. The clipping path may define a shape comprising a plurality of closed area regions with no holes. Further, the clipping path may define a shape comprising a region having a hole. Alternatively, the clipping path may be multi-line segment region boundaries. The calculation of the clipping path may be done by fitting curve segments to boundary points calculated for the silhouette. The invention may render the boundary of the object to a second buffer and subtract the contents of the second buffer from the first buffer. Thus, when the first and second buffers store alpha values, the alpha value of the second buffer is subtracted from the alpha value of the first buffer.

The invention has numerous advantages. The invention allows a graphical object that cannot be easily represented with existing graphics primitives of an API to be rendered using commonly available image and clipping operations. The calculation of the clipping region is robust. Thus, the invention can handle complex graphical objects such as those specified as Bezier patches which may fold over on themselves, leaving boundaries that are not defined explicitly in the specifications of the graphical objects. A high output resolution is achieved because the image on the hard copy device may not be rendered at the same resolution the graphical object was rendered at. The clipped image data is the new intermediate format of the graphic, and can thus be rendered on any device capable of rendering clipped images. The image, when rendered on the device, will then be resampled to the device resolution with minimal artifacts such as jaggy edges.

Other features and advantages of the invention will be apparent from the following description, including the drawings, and from the claims.

BRIEF DESCRIPTION OF THE DRAWING

FIG. 1 is a flowchart of a process for rendering a clipped image on a display device.

FIG. 2 is a flowchart showing in more detail a process in FIG. 1 for rendering graphics to a buffer.

FIG. 3 is a flowchart showing in more detail a process in FIG. 1 for determining a silhouette of an image.

FIG. 4 is a flowchart showing in more detail a process in FIG. 1 for extending edges of the image.

FIG. 5 is a flowchart showing a second process for rendering a clipped image on a display device.

FIG. 6 is a flowchart showing a process for rendering boundaries of a region into a second buffer.

FIG. 7 is a flowchart showing a process for subtracting data from the second buffer.

FIG. 8 is a block diagram of a programmable information processing system according to the invention.

FIG. 9 is a schematic illustration of a printer for rendering a clipped image.

DETAILED DESCRIPTION

Referring now to FIG. 1, a process 100 for rendering resolution independent objects on display devices as clipped images is shown. The resolution independent objects are abstract objects, or objects described in an analytical fashion such as vectors or equations describing the shape of the object. The process 100 first rasterizes the resolution independent object and stores pixel data of the resolution independent object to a raster buffer (step 102). The process 102 is shown in more detail in FIG. 2. Next, the process 100 locates a silhouette of the image (step 104). The silhouette locating process is illustrated in more detail in FIG. 3. Next, the process 100 extends color borders associated at the edges of the image and converts the color border in the buffer in step 106. As discussed below, the process of extending the border in step 106 minimizes ringing artifacts as well as clipping errors to support a high output quality. Step 106 is illustrated in more detail in FIG. 4.

The process 100 then checks whether image compression is to be performed (step 108). If so, the content of the raster buffer is compacted using a compression process such as a Joint Photographic Experts Group (JPEG) process in step 110. The compression process reduces the amount of data to be transmitted to the hard copy device or saved in a file. Various compression processes (in particular those using discrete cosine transforms (DCTs)) introduce ringing artifacts, a series of concentric circles following the shape of the image. Since the ringing artifacts occur at edges of the graphic image, the compression of the image after the color borders have been extended effectively moves the ringing artifacts to the border, which is eventually clipped, and not within the graphic itself. Thus, ringing artifacts, as well as errors during the clip fitting process, are eliminated.

From step 108 or step 110, the process 100 clips the raster image (step 112). Finally, the process 100 resamples the clipped raster image (step 114). During the resampling process, the process 100 may either interpolate the original image to a larger size or sub-sample the original image to a smaller size to allow the user to scale the image to a desired size in accordance with the hard copy device's resolution and other relevant characteristics. Finally, the process 100 renders the image to the display device (step 114) before exiting (step 116).

FIG. 1 shows two software layers 101 and 103. The layer 101 operates on a desktop computer, while the layer 103 operates on a hard copy device such as a PostScript printer executing the PostScript language as the API. Layers 101 and 103 may also be implemented in a single system. This consolidation would occur where the object rendering is done on a computer with an API such as a Graphics Device Interface (GDI). In this latter implementation, the software layer 101 would be an application program, and the software layer 103 would be the implementation of GDI.

Turning now to FIG. 2, step 102 of FIG. 1 is illustrated in more detail. In step 102, the graphics associated with the image data is rendered to the raster buffer by first interpreting the abstract graphical representation of the image (step 120). In this step, the application program interprets an abstract representation of the graphical object and renders the object into a private buffer.

Next, the process 102 allocates sufficient memory for the raster buffer (step 122). Step 122 reserves sufficient space for an alpha channel, which may be a bit or a byte for each pixel. The alpha channel is typically used for transparency purposes in rendering graphics.

Next, the process 102 converts the graphic image to a raster buffer (step 124). The conversion process is a vector to raster conversion where the vector is converted into scan lines or, alternatively, into pixel addresses.

The process 102 then analyzes each pixel (step 126) and determines whether each pixel is part of the graphic object (step 128). If not, the alpha bit associated with the pixel is cleared (step 130). Alternatively, the alpha bit associated with the pixel is set to a nonzero value (step 132). Next, the pixel is painted with the respective graphic color (step 134). From step 130 or 134, the process 102 determines whether or not all pixels have been analyzed (step 136). If not, the process 102 loops back to step 126 to process the next pixel. Alternatively, in the event that all pixels have been processed, the process 102 exits (step 138).

Steps 126–136 detect where the graphic image is painted and generates a mask in a mask buffer, which is conveniently the alpha channel to indicate where pixels have been painted. The mask buffer channel may alternatively be a separate memory such as a pixel array one bit deep. The mask allows the process 100 to distinguish the painted colors from the background colors already in the buffer.

Turning now to FIG. 3, step 104 for determining the silhouette associated with image is illustrated in more detail. The process is performed for each scan line in the raster buffer (step 140). Within each scan line, the process further analyzes each pixel and the scan line (step 142). In this process, the alpha value associated with each pixel is checked to see if it is zero in step 144. If not the pixel is further analyzed to determine whether it is inside a graphic image or not (step 146). If not, the process of 104 sets the inside graphic flag to true (step 148) and further records the start of the graphic edge for the scan line (step 150).

In step 144, in the event that the alpha value associated with the pixel is equal to zero, the process of step 104 proceeds to step 152 where it checks whether the previous pixel is inside the graphic image. If so, the process of step 104 records the end of the graphic edge for the scan line and then clears the inside graphic flag to false (step 154). From step 150 or 154, the process of step 104 determines whether or not all pixels in the particular scan line have been analyzed (step 156). If not, the process of step 104 loops back to step 142 and continues the analysis of the remaining pixels in a scan line. Alternatively, if all the pixels in a particular scan line have been analyzed, the process of step 104 proceeds to step 158 to check whether or not all scan lines have been analyzed. If not, the process loops back to step 140 to continue analyzing the next scan line. Otherwise, the process converts the record of the graphic scan lines into a set of points or curves representing the clipped image using the target application programming interface (API) format (step 160) before exiting (step 162). In this manner, a regions or a closed area with no holes, is formed from the scan lines. Each region is traversed from one side of the region to the other side and scan lines are processed in an increasing scan line order until the last scan line is encountered. Moreover, in the event that the object's shape has holes, a plurality of regions may be defined to suitably process the region with one or more holes.

Referring now to FIG. 4, the process associated with step 106 to extend the color border is shown in more detail. The process associated with step 106 processes scan lines one at a time. Thus, for each scan line of the graphic (step 160), the process determines whether or not the current scan line is the first graphic scan line (step 162). If not, the process of step 106 determines whether or not the current scan line is the last graphic scan line (step 164). If not, the process of step 106 copies the first pixel in the scan line to the previous $\epsilon$ pixels (step 170). It then copies the last pixel in the scan line to the next $\epsilon$ pixels (step 172). From step 162, in the event that the current scan line is the first graphic scan line, the he process proceeds from step 162 to step 166 where it copies the first row of the graphics to the previous $\epsilon$ rows in the buffer before proceeding to step 170. Correspondingly, in step 164, in the event that the current scan line is the last graphic scan line, the process copies the last row of the graphics to the next predetermined number of rows, or $\epsilon$ rows, into the raster buffer (step 168) before proceeding to step 170.

After step 172, the process of 106 determines whether or not all scan lines have been processed (step 174). If not, the process loops back to step 160 to continue processing of the next scan line. Otherwise, the process of step 106 proceeds to remove the alpha values from the raster buffer (step 176). Next, it converts the raster buffer to the appropriate API image data format (step 178) before exiting (step 180). The process of FIG. 4 ensures that a border is positioned around the image of the fitted curve prior to clipping to provide an error margin to avoid both ringing artifacts and curve fitting errors.

As illustrated, the above processes can handle complex graphical objects since they do not rely on the specification of the graphical object to determine the clipping path. Instead, the processes render the graphical object into a buffer, analyze the raster data, and locate a boundary of the graphic image. The boundary is converted into a set of lines, or optionally a set of points generated by the raster data analysis are fitted to a set of curves. The conversion of the raster data to curves provides smooth edges at varying resolutions. Higher output resolution is achieved because the image may not be rendered at the same resolution the graphic was rendered at. The image data and the clip are a new intermediate format of the graphic, and can thus be rendered on any device capable of rendering clipped images. The image, when rendered on the device, will then be resampled to the device resolution. This can cause artifacts: however, if the graphic is smoothly shaded (as is the case of smooth shading gradients), the resampling artifacts will be minimal. On the other hand, edge artifacts would be very noticeable because the human visual system is much more sensitive to edges than gradual changing colors. The jaggy edge artifacts are eliminated by the curve fitting step.

For certain graphical objects that are represented analytically as an abstract representation or a resolution independent object, it is difficult to determine the silhouette. An example of this type of object includes Bezier patches that are smoothly shaded. Typically, the patches have no foldover, or the silhouette of the foldover is a small part of the total silhouette. The patches can fold over on themselves, creating silhouette edges that are not easily defined in terms of one of the four Bezier curves used to define the patches. FIGS. 5–7 show a second embodiment that handles these objects.

Referring now to FIG. 5, a process 105 for rendering objects on display devices as clipped images is shown. The embodiment limits the regions of the graphic on which the silhouette determination is used to regions where it is necessary to find the silhouette from the raster buffer data. The embodiment uses curves representing the analytical description of the graphic as a separate filled region, rendered into a separate buffer. Thus, two raster buffers are used, one buffer containing the graphic such as a shaded Bezier patch with possible foldovers and the other buffer containing a filled region defined by the curves used in the analytical description of the graphic. The second buffer contains the raster data created from filling the region defined by the four boundary curves of the patch. The content of the second buffer is subtracted from the first such that, for every pixel painted the first buffer, if the corresponding pixel was not part of the graphic in the second buffer, the alpha value for the pixel in the first buffer remains unchanged (a non-zero value). If on the other hand, the pixel in the second buffer was painted then the alpha value for the pixel in the first buffer is set to zero.

Referring now to FIG. 5, the process 105 first renders graphics image data to a raster buffer (buffer 1) in step 102. The process 105 renders data from a boundary region to a second buffer (buffer 2) in step 200, which is detailed in FIG. 6. Next, the contents of buffer 2 are subtracted from the contents of the buffer 1 alpha channel (step 220). Step 220 is detailed in FIG. 7. Next, the process 100 locates a silhouette of the image (step 104) and extends color borders associated at the edges of the image and converts the color border in the buffer (step 106). The process 105 then checks whether image compression is to be performed (step 108). If so, the content of the raster buffer is compacted using a compression process (step 110).

From step 108 or step 110, the process 105 clips the raster image (step 112). Finally, the process 105 resamples the clipped raster image and renders the image to the display device (step 114) before exiting (step 116).

Referring now to FIG. 6, the process 200 of FIG. 5 is shown in more detail. In FIG. 6, the process 200 first interprets the abstract representation of the graphic objects' boundary curves (step 202). Next, it allocates sufficient memory for a second buffer to store the alpha channel (step 204). The process 200 then performs a scan line conversion (step 206). Next, from step 208, the process determines for each pixel whether the pixel is inside the boundary curve region (step 210). If so, the alpha value is set to a nonzero value (step 212). Alternatively, if the pixel is outside of the boundary curve region in step 210, the process sets the alpha value to a zero value (step 214). From step 212 or 214, the process determines whether all pixels have been processed (step 216). If not, the process 200 loops back to step 208 to continue processing the remaining pixels before exiting (step 218).

Referring now to FIG. 7, the process 220 of FIG. 5 is shown in more detail. In step 222, for each pixel, the process determines whether the alpha value of the second buffer is zero (step 224). If not, the alpha value of the first buffer is set to zero (step 226). From step 224 or step 226, the process of FIG. 7 determines whether all pixels have been processed (step 228), and if so, exits in step 230.

The process of FIGS. 5–7 adds (performs a union operation) curves found in the silhouette determination to the original curves used to define the graphic. In the case of the Bezier patch, the combination is a complete path description of the entire patch silhouette, which is used as the clip. In this manner, parts of the clip which is defined by the original curves introduce no error into the curve fitting process.

The process of FIGS. 1–7 are executed by a computer system. FIG. 8 illustrates one such computer system 600, including a CPU 610, a RAM 620, and an I/O controller 630 coupled by a CPU bus 640. The I/O controller 630 is also coupled by an I/O bus 650 to input devices such as a keyboard 660 and a mouse 670, and output devices such as a monitor 680.

FIG. 9 shows a typical printer driven by the computer system 600. Referring to FIG. 9, a printer embodying the invention includes an input/output (I/O) interface 730 for receiving page description language commands over a cable or network from the host computer which outputs page description language commands to the common bus 734. Error messages and control information relating to the transfer of data is communicated back to the host via the I/O interface 730. As each page description language command is received, it is stored in random access memory (RAM) 732 over the common bus 734. A microprocessor 736 on the common bus 734 provides the computation and control for generating raster data and supplying the raster data to the print engine controller 738, which in turn passes the raster data to the electromechanical print engine 740 that applies the image to paper.

The program for the microprocessor 736 is permanently stored in a read-only memory (ROM) 742. Input data, intermediate results including the intermediate page representations, the raster buffer data for the current decompressed strip to be sent to the print engine controller and all other variable data are stored in shared RAM 732.

The microprocessor 736, ROM 742, RAM 732 and common bus 734 work together as a raster generator to convert the input page description language commands to raster data driving print engine controller 738. A standard commercial microprocessor, such as the Motorola 68000 family or the Intel i960 family may be used as the microprocessor 736. The RAM 732 is built using conventional dynamic random access memory (DRAM) semiconductor chips. Other required components are conventional commercial digital semiconductor chips or application specific integrated circuits (ASICs) known in the art and used with printed circuit interconnection technology.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A method of rendering a resolution independent graphical object, comprising:

rendering an analytical representation of a graphical object to a raster buffer;

determining a silhouette of the object from its rendered image in the raster buffer;

generating an extended image of the object by extending bits associated with the color of the edges of the object in the raster buffer;

generating clipped image data defining a clipped image of the object from the silhouette and the extended image of the object; and rendering the clipped image of the object.

2. The method of claim 1, wherein the buffer has an alpha channel, further comprising rendering the object to the alpha channel.

3. The method of claim 2, wherein the step of determining the silhouette of the object comprises searching the alpha channel of the raster buffer for the silhouette.

4. The method of claim 1, wherein the step of determining the silhouette of the object comprises determining one or more edges of the object in the raster buffer.

5. The method of claim 4, wherein the step of generating clipped image data defining a clipped image of the object comprises applying a clipping path comprising multi-line segment region boundaries to the image of the object in the raster buffer.

6. The method of claim 1, wherein the step of generating clipped image data defining a clipped image of the object comprises fitting curve segments to boundary points identifying the silhouette of the object.

7. The method of claim 1, further comprising compressing the clipped image.

8. The method of claim 7, wherein the clipped image is compressed using Joint Photographic Experts Group (JPEG) compression.

9. The method of claim 1, wherein the clipped image data is rendered on a PostScript® printer and the rendered image of the object is clipped using a PostScript® clip operator.

10. The method of claim 1, wherein the clipped image is rendered on a PostScript® printer and the rendering step is performed using a PostScript® image operator.

11. A computer program tangibly stored on the computer-readable medium comprising instructions for causing the processor to:

render an analytical representation of a graphical object to a raster buffer;

determine a silhouette of the object from its rendered image in the raster buffer;

generate an extended image of the object by extending bits associated with the color of the edges of the object in the raster buffer;

generate clipped image data defining a clipped image of the object from the silhouette and the extended image of the object; and render the clipped image of the object.

12. The computer program of claim 1, wherein the buffer has an alpha channel, the computer program further comprising instructions for causing the processor to render the object to the alpha channel.

13. The computer program of claim 12, wherein the instruction to determine a silhouette of the object comprises instructions to search the alpha channel of the buffer for the silhouette.

14. The computer program of claim 11, wherein the instruction to determine a silhouette of the object comprises instructions to locate one or more edges of the object in the raster buffer.

15. The computer program of claim 14, wherein the instruction to generate clipped image data defining a clipped image of the object comprise instructions to apply a clipping path comprising multi-line segment region boundaries to the image of the object in the raster buffer.

16. The computer program of claim 11, wherein the instruction to determine the silhouette of the object further comprises instructions to fit curve segments to boundary points identifying the silhouette of the object.

17. The computer program of claim 11, further comprising instructions to compress the clipped image.

18. The computer program of claim 17, wherein the clipped image is compressed using Joint Photographic Experts Group (JPEG) compression.

19. A method of rendering a resolution independent object on a graphical rendering system having an application program interface (API), comprising:

rendering an analytical representation of a graphical object into a raster image in a raster buffer;

calculating a silhouette of the object from the raster image in the raster buffer;

calculating a clipping path from the silhouette of the raster image;

generating an extended raster image by extending bits associated with the color of the edges of the object in the raster buffer; and providing the extended raster image and the clipping path to the rendering system API.

20. The method of claim 19, wherein the API is a PostScript Level 1 API.

21. The method of claim 19, wherein the API is a PostScript Level 2 API.

22. The method of claim 19, wherein the clipping path defines a shape comprising a plurality of closed area regions with no holes.

23. The method of claim 19, wherein the clipping path defines a shape comprising a region having a hole.

24. The method of claim 19, wherein the clipping path comprises multi-line segment region boundaries.

25. The method of claim 19, wherein the step of calculating a clipping path comprises fitting curve segments to boundary points calculated for the silhouette.

26. A method of rendering a resolution independent object on a graphical rendering system having an application program interface (API), comprising:

retrieving the resolution independent object; and generating a smoothly shaded image of the resolution independent object by:

rendering the object as a raster image in a first buffer;

calculating a silhouette of the object from the raster image in the first buffer;

calculating a clipping path from the silhouette of the raster image;

generating an extended raster image by extending bits associated with the color of the edges of the object in the raster buffer; and providing the raster image and the clipping path to the rendering system API.

27. The method of claim 26, wherein the API is a PostScript Level 1 API.

28. The method of claim 26, wherein the API is a PostScript Level 2 API.

29. The method of claim 26, wherein the clipping path defines a shape comprising a plurality of closed area regions with no holes.

30. The method of claim 26, wherein the clipping path defines a shape comprising a region having a hole.

31. The method of claim 26, wherein the clipping path comprises multi-line segment region boundaries.

32. The method of claim 26, wherein the step of calculating a clipping path comprises fitting curve segments to boundary points calculated for the silhouette.

33. The method of claim 26, further comprising rendering the boundary of the object to a second buffer.

34. The method of claim 33, further comprising subtracting the contents of the second buffer from the first buffer.

35. The method of claim 34, wherein the first and second buffers store alpha values, further comprising subtracting the alpha value of the second buffer from the alpha value of the first buffer.

* * * * *

UNITED STATES PATENT AND TRADEMARK OFFICE
CERTIFICATE OF CORRECTION

PATENT NO.   : 6,424,430 B1
DATED        : July 23, 2002
INVENTOR(S)  : William D. Bilodeau et al.

It is certified that error appears in the above-identified patent and that said Letters Patent is hereby corrected as shown below:

Column 9,
Line 15, amend "claim 1" to -- claim 11 --.

Signed and Sealed this

Twenty-third Day of December, 2003

JAMES E. ROGAN
*Director of the United States Patent and Trademark Office*